United States Patent [19]

Cernik

[11] Patent Number: 4,471,353

[45] Date of Patent: Sep. 11, 1984

[54] PUSH-BUTTON SWITCH FOR AN ELECTRICAL POWER SOURCE

[75] Inventor: George Cernik, Costa Mesa, Calif.

[73] Assignee: Hughes Aircraft Company, El Segundo, Calif.

[21] Appl. No.: 311,366

[22] Filed: Oct. 14, 1981

[51] Int. Cl.³ .............................................. H04Q 9/14
[52] U.S. Cl. .............................. 340/825.72; 340/543; 331/155; 331/156; 455/613
[58] Field of Search ............... 340/825.72, 543, 870.3; 290/1; 455/94, 613, 100, 617; 200/68; 307/140, 153; 310/36, 25; 331/156, 155; 322/3

[56] References Cited

U.S. PATENT DOCUMENTS

| | | | |
|---|---|---|---|
| 2,874,292 | 2/1959 | Varley | 455/127 |
| 3,056,932 | 10/1962 | Wood | 310/25 |
| 3,077,574 | 2/1963 | Marks | 455/127 |
| 3,315,166 | 4/1967 | Crump | 455/127 |
| 3,457,522 | 7/1969 | Kosta, Jr. | 310/25 |
| 3,633,106 | 1/1972 | Willis | 455/127 |
| 3,909,745 | 9/1975 | Dye | 340/870.3 |
| 4,143,368 | 3/1979 | Route et al. | 340/543 |
| 4,264,896 | 4/1981 | Sakarya et al. | 455/613 |

*Primary Examiner*—Donald J. Yusko
*Attorney, Agent, or Firm*—John Holtrichter, Jr.; A. W. Karambelas

[57] ABSTRACT

A slide switch is movable in the direction of oscillation of the reed of a magnetic circuit. A resilient arm is attached at one of its ends to the switch. The slide switch drives the arm in the direction of the oscillation of the reed, the motion of the arm being in a plane parallel to the oscillation path of the reed but removed from it. A ramp is located adjacent the opposite end of the arm and intersects the plane of the oscillation path of the reed, one end of the ramp engaging the opposite arm end at its equilibrium position and the other end of the ramp extending well into the plane of the oscillation path of the reed.

5 Claims, 7 Drawing Figures

PUSH-BUTTON SWITCH FOR AN ELECTRICAL POWER SOURCE

RELATED APPLICATIONS

The application is related to U.S. patent application Ser. No. 311,367 now U.S. Pat. No. 4,412,355 filed herewith by William Terbrack and Lee Hummel, entitled "Push Button Operated Electrical Power Source for an Optical Communication Link", and assigned to the assignee of the present application.

TECHNICAL FIELD

This invention is related to infrared pulse-coded optical communication links.

BACKGROUND ART

Commercial passenger airplanes are typically designed to provide the maximum comfort and convenience for passengers by providing such features as overhead fans, lights, stewardess call buttons, stereo headphones and movies. The size and weight of such features is necessarily limited in order that the airplane may carry the maximum number of passengers with as much passenger space as possible. Accordingly, because each passenger must exercise control over his own overhead fan, light and stewardess call button, most of the control hardware and cabling is provided in the overhead ceiling above the passengers, since this represents the simplest arrangement for all of the control lines and control hardware.

It would be desirable to provide for passenger control of all the foregoing items in the armrest of each passenger chair on an individual basis. It might be possible to simply install a number of switches in the arm of the passenger chair and connect them through wires or cabling to the hardware and wiring already existing in the overhead ceiling. However, this would not be suitable because the installation of electrical wiring between the passenger seat and the ceiling makes such a device impractical and expensive to retrofit on existing airliners.

SUMMARY OF THE INVENTION

In the present invention, these problems are overcome by the installation of a miniaturized infrared wireless communication link between each passenger seat and the electronics in the overhead ceiling. A miniaturized infrared remote control transmitter is installed in the arm of the passengers seat. One significant problem solved by the present invention is that the infrared transmitter requires electrical power. This would ordinarily require that some electrical connection be made between the electrical power system of the airliner and the transmitter in the passengers seat arm, an undesirable feature. This problem is overcome in the present invention by using a mechanical switch actuated by the passenger to initiate oscillatory motion in a magnetic circuit contained in the transmitter, the magnetic circuit furnishing electrical power to the transmitter.

In the preferred embodiment of this invention, a novel push-button switch is used to permit the passenger to actuate communication by activating the magnetic circuit power supply. The novel push-button switch is a slide switch movable in the direction of oscillation of a reed in the magnetic circuit. A resilient arm is attached at one of its ends to the switch. The slide switch drives the arm in the direction of oscillation of the reed, the motion of the arm being in a plane parallel to the oscillation path of the reed but removed from it. A ramp is located adjacent the opposite end of the arm and intersects the plane of the oscillation path of the reed, one end of the ramp engaging the opposite arm end at its equilibrium position and the other end of the ramp extending well into the plane of the oscillation path of the reed. Accordingly, upon mechanical actuation of the slide switch, the ramp forces the opposite arm end to bend resiliently down into the oscillation path of the reed so that it abuts the magnet, causing elastic displacement of the reed in the path of oscillation. As soon as the arm end reaches the far end of the ramp, it is released to snap resiliently back out of the oscillation path of the reed, permitting the reed and permanent magnet to begin oscillation without interference from the arm.

An advantage of the novel slide switch of the present invention is that the snapping action of the arm described above provides tactile feedback to the passenger, indicating that communication has been effected. Another advantage of the invention is that if the actuation of the slide switch is incomplete, a spring attached to the slide switch forces the switch back to the beginning position so that the device is ready for another attempt by the passenger at communication. Accordingly, the passenger cannot harm the operation of the slide switch regardless of how he operates it.

DESCRIPTION OF THE DRAWINGS

The invention is best understood by reference to the accompanying drawings, of which:

FIG. 1b is a perspective view of the push-button communicator of FIG. 1a;

FIG. 2b illustrates one embodiment of the magnetic circuit of FIG. 2a;

FIG. 2c illustrates an alternative embodiment of the magnetic circuit of FIG. 2a.

DETAILED DESCRIPTION

Figure 1A:
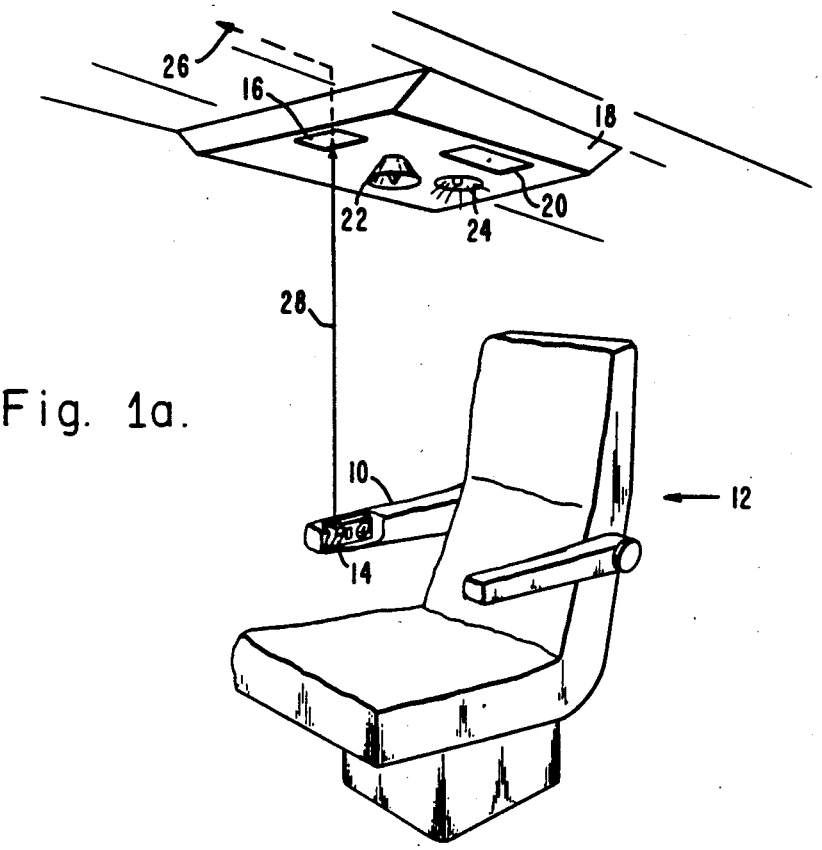
FIG. 1a is a simplified perspective view of the infrared communication link of the present invention installed in the arm of an airline passenger seat.
Figure 1B:
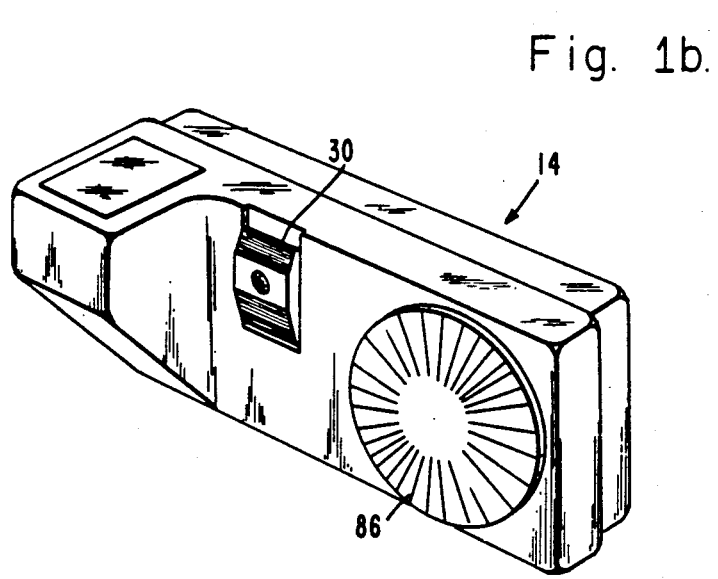

Referring to FIG. 1a and b, the optical communication link of the present invention is installed in the arm 10 of a passenger chair 12 on a passenger airplane or airliner. The optical link includes a push-button actuated communicator 14 which is aligned with an optical receiver 16 located in the ceiling 18 over the chair 12. The receiver 16 communicates with control hardware 20 controlling, for example, an overhead fan 22 and an overhead electric light 24. The receiver 16 may also communicate via a link 26 with a stewardess call display (not shown) located in another part of the airliner.

The communicator 14 transmits a pulse-coded signal comprising an infrared beam 28 to the receiver 16, the communicator and receiver being of the types disclosed in U.S. Pat. Nos. 4,264,982 and 4,241,456.

It is contemplated that the push-button communicator 14 replaces a standard device previously installed in the passenger chair arm 10 of many modern airliners without any alteration to the arm 10 being required.

Figure 2A:
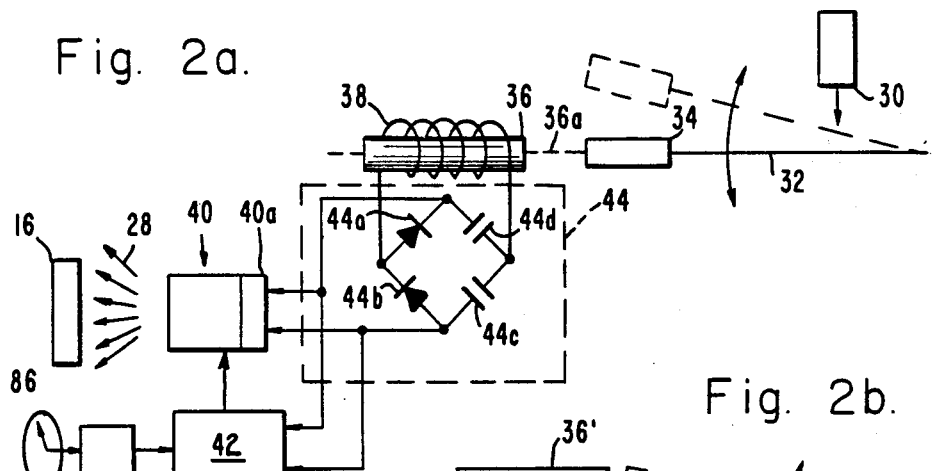
FIG. 2a is a simplified schematic diagram illustrating the magnetic circuit power supply which is the subject of the above-referenced Terbrack and Hummel application.

Manual initiation of the coded signal beam 28 by the passenger and generation of electrical power in the communicator 14 is accomplished simultaneously by the use of a magnetic circuit illustrated in FIG. 2a. The magnetic circuit of FIG. 2a is the subject of the Terbrack and Hummel application referenced above. A manually actuated switch 30 induces oscillatory motion in a resilient reed 32 attached to a permanent magnet 34. The permanent magnet 34 moves back and forth in front of an unmagnetized core 36 around which a coil 38 is wrapped. The motion of the permanent magnet 34 is such that it moves into and out of alignment with axis 36a of the core 36. The permanent magnet 34 therefore induces a change in magnetic flux through the coil 38 during each cycle of its oscillatory motion from approximately zero flux, when the permanent magnet is located in the dashed line position of FIG. 2a, to a maximum flux, when the permanent magnet is located in the solid line position. The coil supplies alternating current electrical power through a rectifier circuit 44 to an infrared transmitter 40 and a pulse code generator 42 controlling the transmitter 40, the transmitter 40 and generator 42 being included within the communicator 14. The rectifier circuit 44 rectifies the alternating current from the coil 38 to a direct current (D.C.) voltage. The rectifier circuit 44 is of the usual type and may include, for example, diodes 44a, 44b and capacitors 44c, 44d. The transmitter 40 generates a pulse-coded infrared signal 28 which is received and decoded in the receiver 16.

Figure 2B:
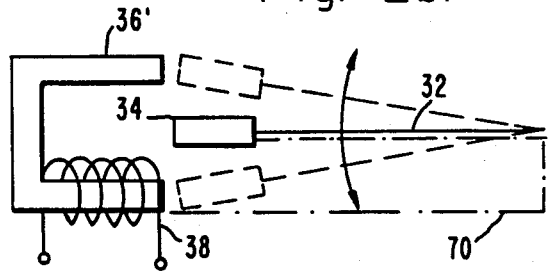

FIG. 2b illustrates a magnetic circuit which is also the subject of the above-referenced Terbrack and Hummel application in which complete magnetic flux reversal through the coil 38 is achieved during each cycle of oscillatory motion of the reed 32. In FIG. 2b, the core 36' has a U-shape, one leg of the U having the coil 38 wrapped around it. The permanent magnet 34 vibrates between the two dashed line positions of FIG. 2b that the direction of the magnetic field through the core 36' is actually reversed each time the permanent magnet moves from one dashed line position to the other dashed line position. Accordingly, the electrical power generated in the coil 38 is maximized.

Figure 2C:
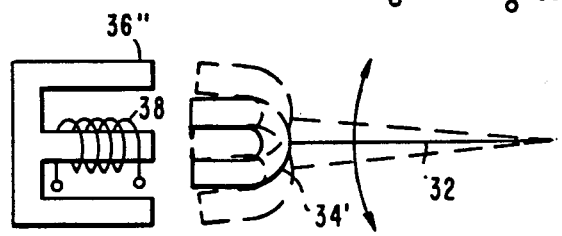

FIG. 2c illustrates still another magnetic circuit which is the subject of the Terbrack and Hummel application comprising a U-shaped permanent magnet 34' having two legs and an E-shaped core 36" having three legs, the U-shaped magnet 34' alternating between the two dashed line positions illustrated in FIG. 2c in which each leg of the U-shaped permanent magnet 34' faces a different pair of the three legs of the core 36". Again, complete flux reversal through the coil 38 is achieved during each cycle of motion, a significant advantage.

It should be apparent to a skilled worker that the current generated in the coil 38 is an alternating current which is rectified by the rectifier bridge circuit 44 to the desired voltage. Furthermore, it is contemplated that an electronic circuit 40a (illustrated in FIG. 2a) may be provided which initially disables the operation of the transmitter 40 during the first few cycles of motion of the reed 32 until the capacitors 44c, 44d have been charged to the desired voltage. Of course, only a fraction of a second is required for the code generator 42 and transmitter 40 to generate the coded infrared signal beam 28, so that oscillatory motion of the reed 32 is required for only a fraction of a second.

In another version of the power supply of FIG. 2b, a magnetic return path 70 (comprising an iron material) may be connected between the permanent magnet 34' and the unmagnetized core 36'.

Figure 3A:
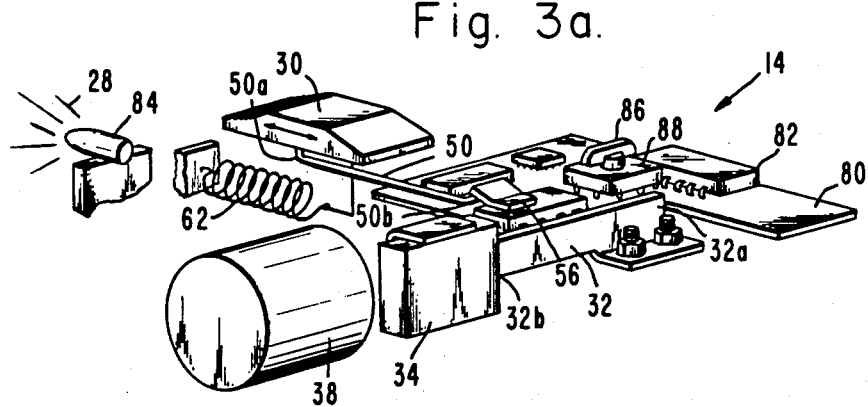
FIGS. 3a and 3b are exploded views of the push-button optical communicator of FIG. 1b, including the push-button switch which is the subject of the present application.

The communicator 14 is illustrated in perspective in FIG. 3a and includes an integrated circuit chassis 80 having a plurality of integrated circuits 82, various ones of the integrated circuits 82 comprising the infrared transmitter 40 and the pulsed-coded generator 42. An infrared light emitting diode 84 is mounted on the chassis 80 and is controlled by the infrared transmitter 40. A rotating switch 86 controls a code selector 88 connected to certain ones of the integrated circuits 82 which comprise the code generator 42. The passenger dials a code which corresponds to the desired function by rotating the switch 86, and then manually actuates the slide switch 30 to transmit the code from the transmitter 40 to the receiver 16.

IMPROVED PUSH-BUTTON SWITCH

Figure 3B:
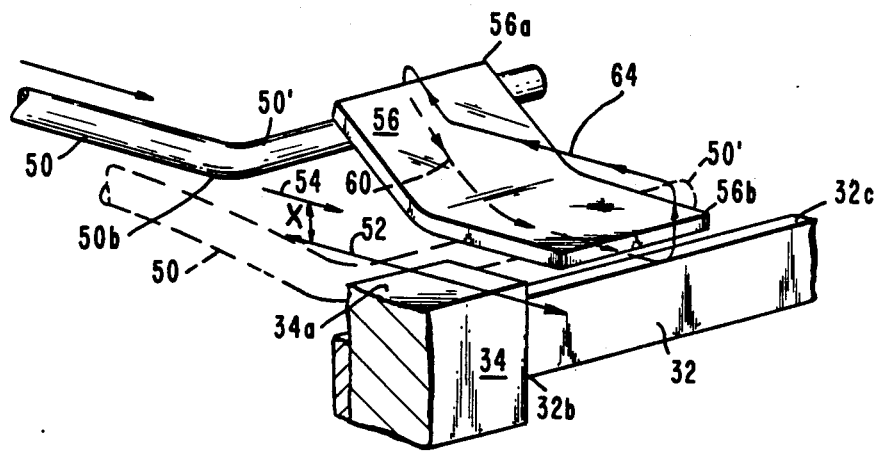

The improved push-button slide switch which is the subject of the present application is illustrated in perspective view in FIGS. 3a and 3b. The slide switch 30 actuated by the passenger is attached to an arm 50 which is located near the reed 32. The reed 32 is anchored at one of its ends 32a and secured to the permanent magnet 34 at the other of its ends 32b. The reed 32 is sufficiently resilient so that the magnet 34 may oscillate with the reed end 32b along an arcuate oscillation path 52. The slide switch 30 forces the arm 50 to move in a second path 54 parallel to the oscillation path 52 but vertically displaced by a distance X above the oscillation path 52. As employed in this description, the terms "vertical" and "horizontal" are used with reference to the orientation of the perspective view of FIGS. 3a and 3b. The arm 50 is attached to the slide switch 30 at one of its ends 50a, the opposite arm end 50b being resiliently displaceable in a direction parallel to the vertical displacement X between the two paths 52, 54.

A curved ramp 56 having two ends is located adjacent the arm 50 and the permanent magnet 34. A finger 50' is formed at the arm end 50b and extends transversely with respect to the arm 50 towards the ramp 56. One end 56a of the ramp is above the oscillation path 52 of the magnet 34 and engages the finger 50', the other end 56b of the ramp 56 being located slightly below the oscillation path 52. Thus, the ramp 56 intersects the horizontal plane of both the oscillation path 52 and of the arm displacement path 54. However, the ramp 56 itself does not lie in the oscillation path 52 of the magnet 34, the ramp 56 being laterally displaced from the magnet 34 and overlying, instead, the reed 32. The ramp end 56b lies above the top 32c of the reed 32 so as not to interfere with the reed motion. However, the vertical level of the ramp end 56b is below the vertical level of the top 34a of the magnet 34.

Accordingly, when the slide switch 30 moves the arm 50 along the path 54, the finger 50' is forced downwardly across the bottom face of the ramp 56 along a route 60, forcing the arm end 50b to be resiliently displaced into the oscillation path 52 so that the arm end 50b engages the permanent magnet 54. As the slide switch 30 is moved further, the magnet 34 and reed 32 are resiliently displaced along the oscillation path 52. When the finger 50' reaches the ramp end 56b, the finger 50' is suddenly released, so that it resiliently snaps upwardly out of the oscillation path 52 and toward the original path 54. A spring 62 forces the slide switch 30 to be returned to its original position so that the arm 50 and finger 50' are returned to their equilibrium position illustrated in FIG. 3 along a return route 64. The arm 50 and finger 50' are initially adjusted during manufacture so that their equilibrium position corresponds to their solid line position in FIGS. 3a and 3b.

As soon as the finger 50' has snapped back to the original path 54, the arm end 50b no longer engages the permanent magnet 34 so that the arm 50 and finger 50' are out of the path of oscillation 52 and therefore do not interfere with the oscillating motion of the permanent magnet 34 thereafter. One advantage of the snapping motion of the finger 50' at the ramp end 56b is that it provides tactile feedback to the passenger at the slide switch 30 so the passenger knows that communication has been effected.

What is claimed is:

1. A self-powered miniaturized communication link, comprising:
   a transmitter adaptable for transmitting a coded signal;
   a manually actuated switch;
   a power supply comprising a magnetic circuit connected to said transmitter including a movable element comprising a magnetic material;
   a reed supporting said movable element and being elastically displaceable in an oscillation path;
   an arm having two ends and being attached at one of said ends to said manually actuated switch, the other of said ends being elastically displaceable from an equilibrium position which is out of said oscillation path, said arm movable upon manual actuation of said switch toward at least one of said element and said reed; and
   means for displacing said other arm end into said oscillation path upon manual actuation of said switch, and then releasing said other arm end from said oscillation path, said ramp having two ends, said ramp sloping between said equilibrium position at one of said ends and said oscillation path at the other of said ramp ends, wherein said other arm end resiliently snaps out of said oscillation path whenever it has reached the other ramp end upon manual actuation of said switch.

2. In a magnetic circuit, a manual actuator, comprising:
   a reed associated with an element of said circuit, said reed being resiliently displaceable in an oscillation path in a first direction;
   a manually actuated arm displaceable in a plane parallel to said first direction upon manual actuation, and having an equilibrium position out of said oscillation path, said arm being elastically displaceable in a second path which intersects said oscillation path; and
   means resiliently displacing said arm along said second path into said oscillation path whenever said arm moves in said first direction and for then releasing said arm out of said oscillation path, said displacement means comprising a ramp having two ends, one of said ends located adjacent said equilibrium position and the other of said ends located adjacent said oscillation path, said ramp engaging said arm.

3. In a magnetic circuit having a plurality of magnetic elements, a manual actuator comprising:
   a resilient reed having two ends, one of said ends being anchored and the other of said ends being connected to an element of said magnetic circuit, said reed being elastically displaceable in an arcuate oscillation path about an axis passing through said one end of said reed;
   a slide switch movable along a path tangent to said arcuate path;
   an arm having two ends movable by said slide switch along said tangent path in a plane not intersected by said arc, said arm attached at one end to said slide switch, the other end of said arm being elastically displaceable out of said plane; and
   means for displacing said other arm end out of said plane so that said other arm end engages at least one of said permanent magnet and said reed, and for then releasing said one arm end out of said plane, said displacing means comprising a ramp having two ends, said ramp sloping between said plane at one of its ends and the oscillation path of said reed at the other of its ends, said arm further comprising a finger formed at the other end of said arm and extending transversely therefrom, said finger engaging said ramp whereby said one arm end is displaced out of said plane toward said oscillation path upon movement of said slide switch beginning at said one ramp end, said finger being resiliently released at the other of said ramp ends.

4. The device of claim 3 wherein said displacing means provides tactile feedback at said slide switch upon the resilient release of said finger.

5. A self-contained manually actuatable electrical power supply comprising in combination:
   a. a frame;
   b. a manually operable slide mounted on said frame for linear movement relative thereto, between initial and terminal positions, and biased toward said initial position;
   c. a deflectable arm cantilevered at one end on said slide to be moved thereby between initial and terminal positions and carrying a cam-following finger at its other end;
   d. a cam mounted on said frame, said cam having a sloped surface in the path of said finger, so positioned as to engage and deflect said arm as its finger travels along said slope, said slope terminating short of the end of said finger's travel so that, when said finger travels past the end of said slope, said arm snaps free from its deflected condition, free to be returned to its initial position by said slide;
   e. an electromagnetic circuit having two elements, one of which is mounted on said frame;
   f. a deflectable reed cantilevered at one end on said frame, its free end carrying the other element of said electromagnetic circuit, so that the two elements of said circuit become alternately juxtaposed and separated during deflection and release of said reed, said reed and the other element carried thereby comprising a vibratable member;
   g. the finger of said deflectable arm being so positioned that, during the travel of said slide toward its terminal position, said finger abuts against and deflects said vibratable member, said finger, upon snapping free from its deflected position, springing out of contact with, and releasing, said vibratable member from its deflected position, whereby the vibratable member breaks into oscillation and the second element of said magnetic circuit is caused repeatedly to swing past the first member of said circuit, generating a magnetic flux thereby.

* * * * *